(12) United States Patent
Berger et al.

(10) Patent No.: US 6,220,970 B1
(45) Date of Patent: Apr. 24, 2001

(54) VIRBRATION ABSORPTION ASSEMBLY

(75) Inventors: Alvin Henry Berger, Brownstown; Craig Edward Burch, West Bloomfield, both of MI (US)

(73) Assignee: Ford Global Tech., Inc, Dearborn, MI (US)

(*) Notice: Subject to any disclaimer, the term of this patent is extended or adjusted under 35 U.S.C. 154(b) by 0 days.

(21) Appl. No.: 09/435,309

(22) Filed: Nov. 5, 1999

(51) Int. Cl.[7] .................................. F16F 15/10; F16H 7/00
(52) U.S. Cl. ........................ 464/180; 474/148; 474/156; 474/161; 74/574
(58) Field of Search ...................... 464/180, 185, 464/3, 7; 188/378; 474/161, 179, 156, 157, 160, 159, 148; 74/574

(56) References Cited

U.S. PATENT DOCUMENTS

| | | | |
|---|---|---|---|
| 2,137,591 | * 11/1938 | Sarazin | .................................. 74/574 |
| 2,346,972 | 4/1944 | Kishline . | |
| 3,109,321 | * 11/1963 | Rogers | .................................. 74/574 |
| 3,222,953 | 12/1965 | Benjamen . | |
| 3,696,688 | * 10/1972 | Goodrich et al. | .................. 74/574 |
| 4,075,909 | * 2/1978 | Deakin | .................................. 74/574 |
| 4,739,679 | * 4/1988 | Berger et al. | ........................ 74/574 |
| 5,219,144 | * 6/1993 | Fox et al. | .............................. 384/99 |
| 5,272,937 | 12/1993 | Brosowske et al. . | |
| 5,295,411 | 3/1994 | Speckhart . | |
| 5,351,574 | 10/1994 | Hiraishi et al. . | |
| 5,533,422 | 7/1996 | Speckhart . | |
| 5,640,935 | 6/1997 | Ishihara . | |
| 6,109,227 | * 8/2000 | Mott | .................................... 464/180 |

FOREIGN PATENT DOCUMENTS

| | | |
|---|---|---|
| 401962 | 11/1933 | (GB) . |
| 598646 | 2/1948 | (GB) . |

OTHER PUBLICATIONS

William Ker Wilson, Practical Solution of Torsional Vibration Problems, Chapter XXX, pp. 524–559, Vol. Four, Chapman & Hall Ltd.

Neil Hutton, Heavy Duty Engine Noise Reduction Using Torsional Dampers on Fuel Pump Shafts, pp. 703–712, Holset Engineering Ltd.

* cited by examiner

Primary Examiner—Lynne H. Browne
Assistant Examiner—Kenn Thompson
(74) Attorney, Agent, or Firm—Ford Global Tech. INC

(57) ABSTRACT

A vibration absorption assembly 12 and method for making the same having a base portion 30 which is movably connected to an intermediate portion 32 and to a top portion or cover 32. Assembly 12 contains several apertures or cavities 26 which operatively contain a pair of balls or spherical members 28 which absorb or dampen the vibrations emanating from a rotating member, such as a diesel fuel injection pump 14. Oil 27 is communicated into apertures 26 and is effective to lubricate the moving members 28. Further, portion or member 32 is selectively movable to allow access to several of the cavities or apertures 26 in order to allow fuel injection pump 12 to be removed from the engine 10 by use of fasteners 80, 82, and 84.

20 Claims, 4 Drawing Sheets

VIRBRATION ABSORPTION ASSEMBLY

FIELD OF THE INVENTION

The present invention relates to a vibration absorption assembly and more particularly, to a vibration absorption assembly for use upon a fuel injection pump and which absorbs torsional vibrations emanating from and/or generated by the fuel injection pump.

BACKGROUND OF THE INVENTION

Combustion engines, including without limitation diesel type engines, include various operatively interconnected components, devices, and/or assemblies which cooperatively provide and/or allow fuel to be selectively combusted and to generate rotational torque which allows a vehicle to be driven. Many of these interconnected components, devices, and/or assemblies rotate and move in a desired manner. For example, a fuel injection pump, within a diesel engine, is rotatably moved in order to allow and/or cause fuel to enter various combustion chambers of the engine.

Many of these rotatably movable engine components, such as a fuel injection pump, often experience irregular agitation and/or interruption which tends to cause vibration and, more specifically, torsional type vibration and/or vibrational energy. The torsional vibration is undesirable since it causes fatigue to the vibrating component and/or increases the amount of stress which is transmitted and/or communicated to other adjacent and interconnected assemblies and/or components, potentially damaging these components and undesirably and adversely effecting overall engine operation.

For example, the torsional vibrational energy emanating from the fuel pump increases the stress which is communicated to the chain which typically couples the fuel injection pump to the crankshaft. This stress may cause the chain to break or fail, thereby undesirably causing the engine to fail and to be damaged and/or destroyed. In order to reduce the amount of torsional vibration induced stress and fatigue produced by a rotatably movable engine component, such as a fuel pump, it is desirable to selectively and substantially reduce, dampen, and/or absorb the vibration and/or vibrational energy emanating from that component.

Some attempts have been made to selectively reduce these vibrations by the use of vibration absorbers with rubber type elastic members which were respectively tuned to a particular frequency. Such attempts have failed to adequately function over long periods of time because the elasticity of the constituent rubber material varies greatly with variations in operating temperatures, and over a period of time hot engine oil damages the rubber. Furthermore, such prior attempts did not adequately allow the fuel injection pump, or the other vibrating component upon which these elements were deployed, to be easily serviced and/or quickly removed from the engine.

There is, therefore, a need for a vibration absorption assembly which overcomes some or all of the previously delineated drawbacks of prior vibration absorption assemblies, which substantially reduces and/or dampens the amount of vibration which is generated by and/or which emanates from a diesel fuel injection pump, and which allows the diesel fuel injection pump to be easily and quickly serviced and/or removed from the engine.

SUMMARY OF THE INVENTION

It is a first object of the present invention to provide a vibration absorption assembly which overcomes some or all of the previously delineated drawbacks of prior vibration absorption assemblies.

It is a second object of the invention to provide a vibration absorption assembly which overcomes some or all of the previously delineated drawbacks of prior vibration absorption assemblies and which allows for the selective, efficient, and reliable absorption and/or reduction in the amount of vibrational energy which is generated by and/or which emanates from a diesel type fuel pump.

It is a third object of the invention to provide a vibration absorption assembly which overcomes some or all of the previously delineated drawbacks of prior vibration absorption assemblies and which allows a diesel type fuel injection pump to be easily serviced and/or removed from the engine.

It is a fourth object of the invention to provide a vibration absorption assembly which overcomes some or all of the previously delineated drawbacks of prior vibration absorption assemblies and which allows the vibration absorption assembly to be lubricated, thereby increasing the operating life of the vibration absorption assembly.

According to a first aspect of the present invention, a vibration absorption assembly for use in combination with a vibrating member is provided. The vibration absorption assembly comprises a housing which is mounted upon the selectively vibrating member and which includes at least one cavity; a first aperture which communicates with the at least one cavity; a second aperture which communicates with the at least one cavity and which cooperates with the first aperture, to cause oil to enter the cavity, to traverse the cavity, and to exit the cavity through the second aperture; and a pair of members which are moveably deployed within the cavity and which cooperatively dampen the vibration of the vibrating member, the pair of members being lubricated by the oil which traverses the cavity.

According to a second aspect of the invention, a method for reducing the amount of vibrations emanating from a selectively rotatable member is provided. The method comprises the steps of forming at least one cavity within a portion of the selectively rotatable member, the cavity having opposed first and second end portions which access the cavity; movably disposing a pair of elements within the at least one tapered cavity; and tapering the first of the end portions, effective to substantially prevent the pair of elements from exiting the at least one cavity through the first of the end portions; and selectively covering the second of the end portions, thereby allowing the elements to be selectively and movably captured within the at least one cavity, effective to reduce the vibrations of the member.

These and other features, objects, aspects, and advantages of the present invention will become apparent upon reading the following detailed description in combination with the accompanying drawings.

DETAILED DESCRIPTION OF THE PREFERRED EMBODIMENT OF THE INVENTION

Figure 1:
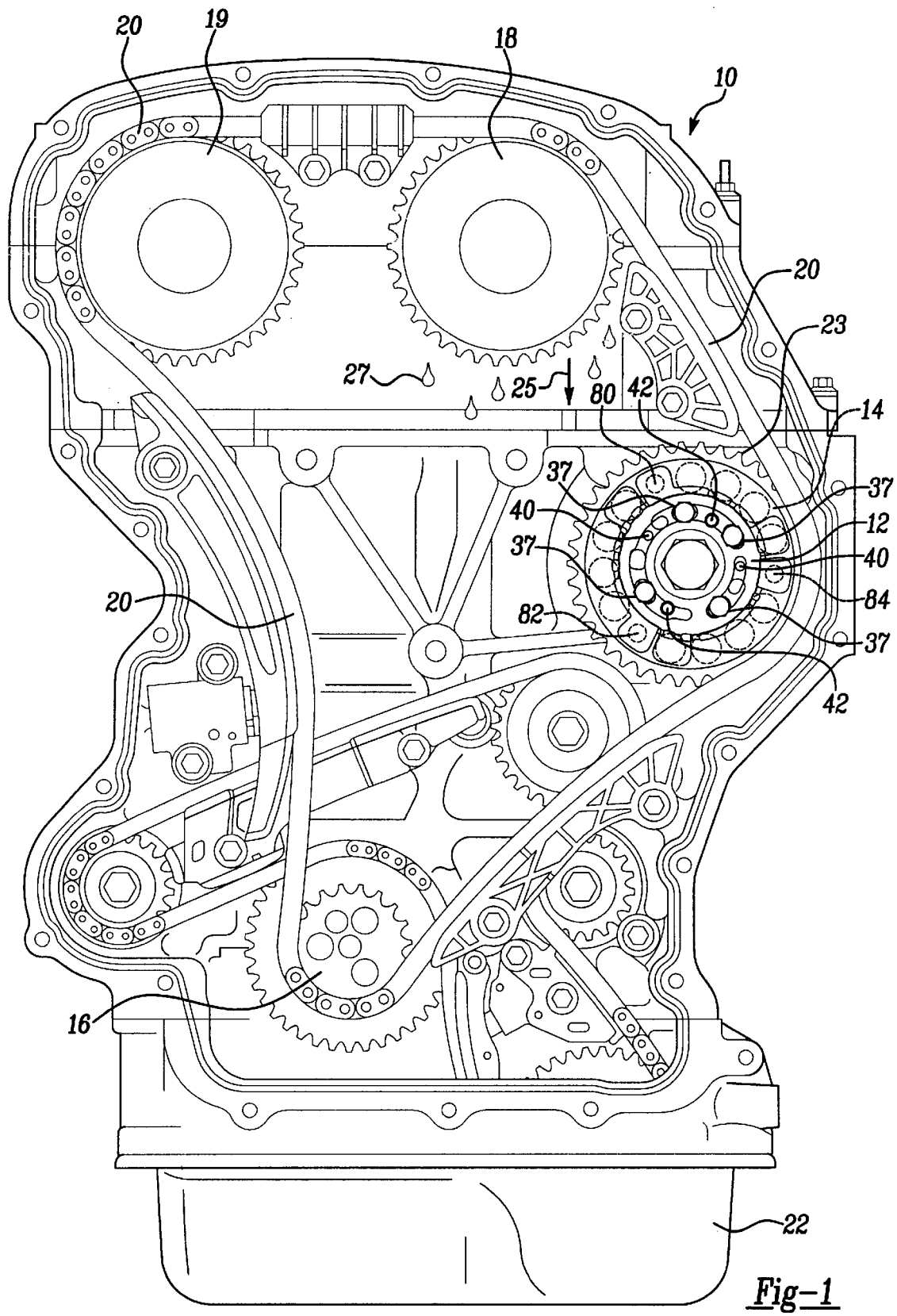
FIG. 1 is a side view of an internal combustion diesel engine having a vibration absorption assembly which is produced and/or which is formed in accordance with the teachings of the preferred embodiment of the invention.

Referring now to FIG. 1, there is shown a conventional internal combustion diesel type engine 10 having a vibration absorption assembly 12 which is formed and/or produced in accordance with the teachings of the preferred embodiment of the invention and which, in one non-limiting embodiment of the invention, is integrally formed within and/or is contained and/or is operatively deployed within and/or upon the sprocket portion 23 of the conventional diesel fuel injection pump assembly 14. In another non-limiting embodiment of the invention, assembly 12 comprises an assembly which may be selectively and operatively attached to and/or coupled to the sprocket portion 23 and/or to another type of vibrating component and/or assembly. Specifically, as shown best in FIG. 1, the diesel engine 10 further includes a selectively rotatable and/or movable and conventional crankshaft assembly 16, outlet camshaft 19, and inlet camshaft 18. Fuel injection pump 14, crankshaft 16, and camshaft assemblies 18, 19 are interconnected by a conventional chain 20 which operatively moves and/or rotates within the engine 10, thereby allowing components and/or assemblies 14, 16, 18, and 19 to perform their respectively desired, conventional, and known functions.

As further delineated below, vibration reduction assembly 12 substantially reduces the amount of vibration and/or vibrational energy produced by, communicated by, emanating from, and/or released by the fuel pump assembly 14. Specifically, when the fuel pump assembly 14 is rotating and/or is operatively engaged by chain 20, the vibration absorption assembly 12 operatively absorbs and/or reduces the amount or the level of the produced torsional vibration emanating from and/or released by the fuel pump assembly 14, thereby substantially preventing and/or reducing the probability or likelihood that these torsional type vibrations and/or the generated vibrational energy will be destructively communicated to the chain 20.

A conventional and commercially available lubricating fluid, such as oil 27, typically "drips" downward from camshaft 18, in the direction of arrow 25, thereby lubricating the fuel pump sprocket 23. This oil 27, in the preferred embodiment of the invention and in a manner which is more fully delineated below, is drawn into the rotating vibration absorption assembly 12, and is effective to lubricate certain vibration absorption components of the vibration reduction assembly 12, thereby allowing the assembly 12 to desirably dampen and/or absorb vibrational energy with substantially minimal and/or reduced wear, as the engine 10 is operated. The available oil 27 then exits from the assembly 12 and falls or flows through engine 10 and collects, pools, or drains, in a known manner, into a conventional oil pan or reservoir 22. The use and operation of the vibration absorption assembly 12 is further explained below.

Figure 2:
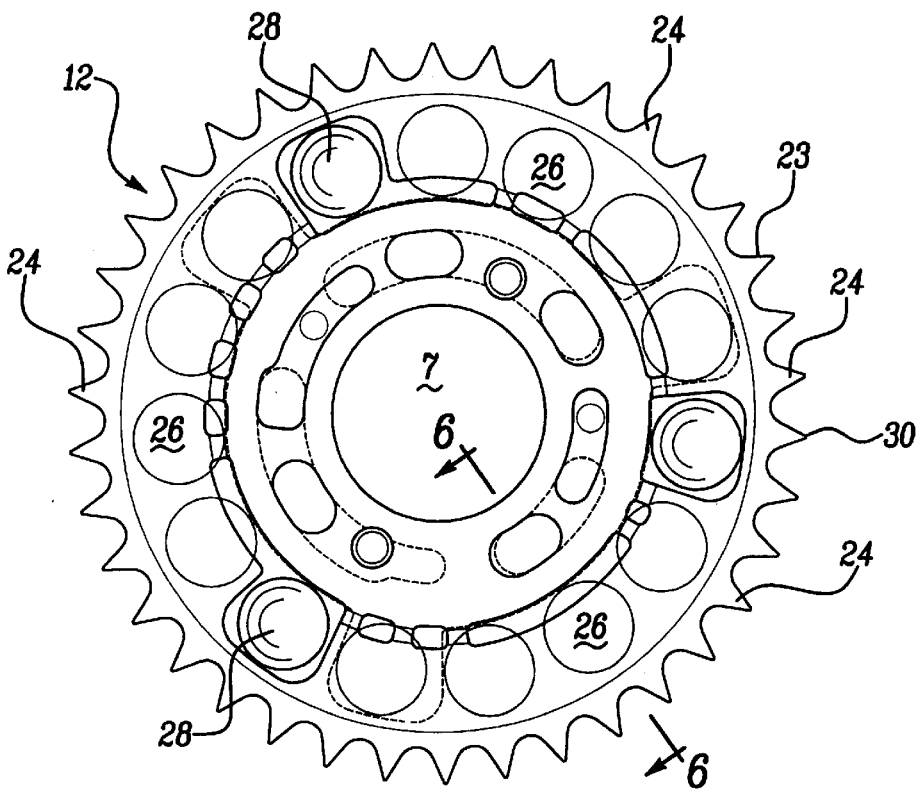
FIG. 2 is a front view of the vibration absorption assembly which is produced and/or which is formed in accordance with the teachings of the preferred embodiment of the invention, which is shown in FIG. 1, and which is selectively moved to a first position.
Figure 3:
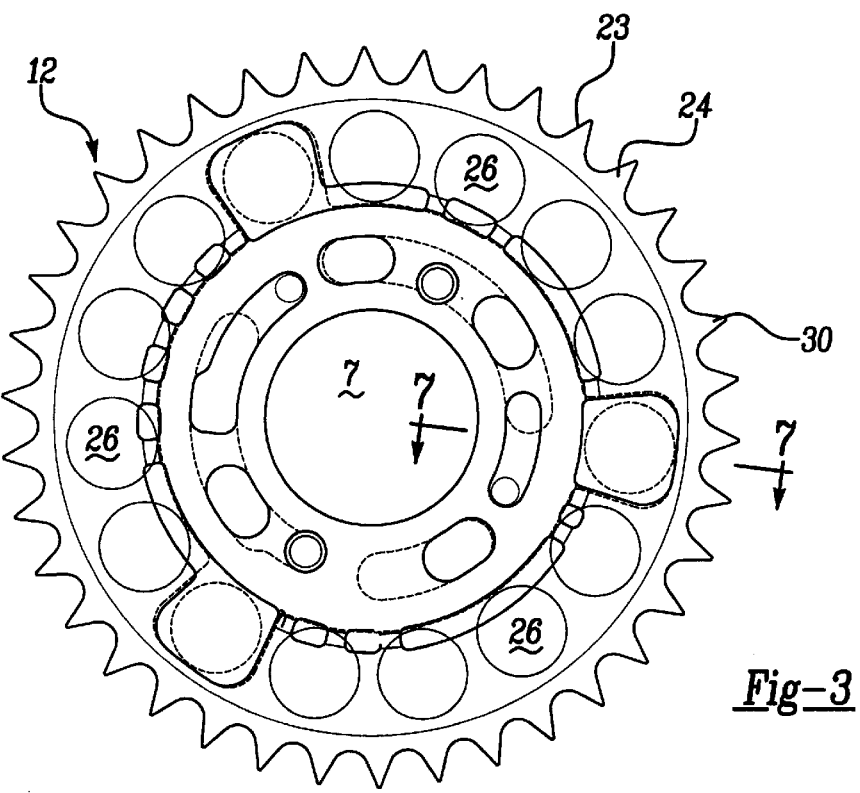
FIG. 3 is a view of the vibration absorption assembly which is similar to that shown in FIG. 2, but which illustrates the movement of the vibration absorption assembly to a second position.
Figure 4:
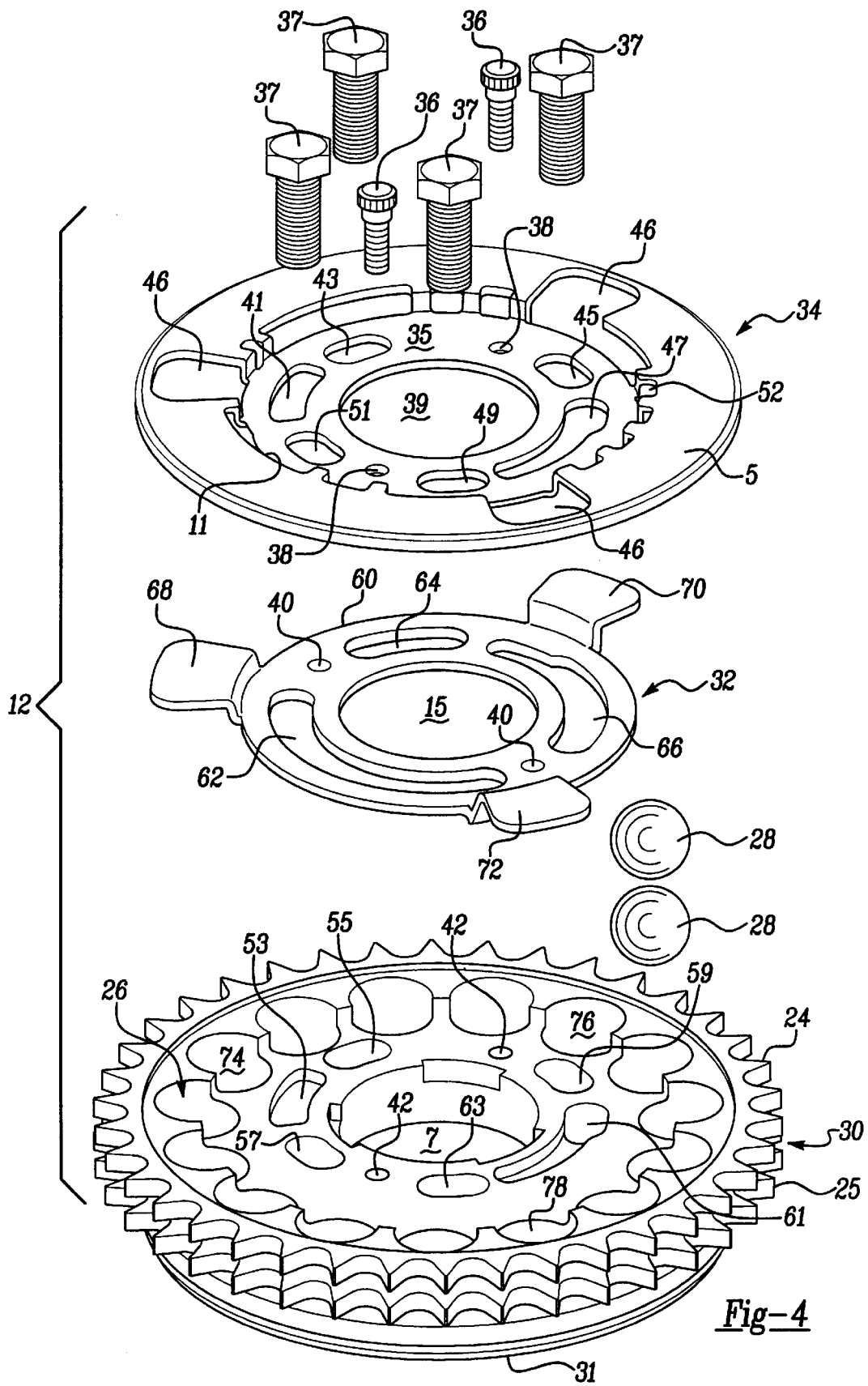
FIG. 4 is a perspective unassembled view of the vibration absorption assembly which is shown in FIG. 1.
Figure 5:
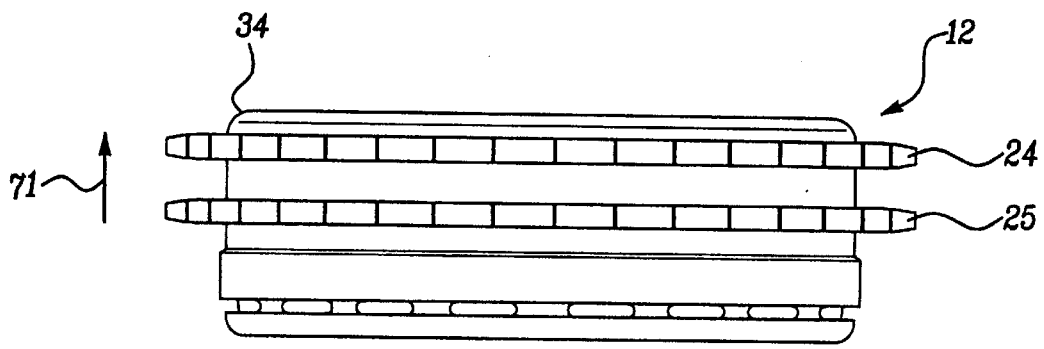
FIG. 5 is a side view of the vibration absorption assembly which is shown in FIG. 1.

As shown best in FIGS. 2, 3, and 4, assembly 12 includes a base portion 30 which is relatively round and/or which is generally circular in shape and which, in one non-limiting embodiment of the invention, forms and/or comprises a conventional diesel fuel injection pump sprocket mechanism and/or assembly. In the preferred embodiment of the invention, base portion 30 is modified and/or adapted to provide the desired vibrational absorption functionality, while concomitantly providing conventional fuel injection pump sprocket functionality. Hence, as should be appreciated by those of ordinary skill in the art, base portion 30 contains a central aperture 7 which allows the base portion 30 to be selectively mounted upon the fuel injection pump 14. Base portion 30 further includes two substantially identical and evenly spaced or evenly separated serrations, and/or "teeth" 24, 25 which are circumferentially and protrudingly disposed around the formed aperture 7. Different amounts and/or arrangements of teeth may be used in other non-limiting embodiments. It should be appreciated that protrusions or teeth 24, 25 are cooperatively used to interconnectively engage chain 20, effective to rotate assembly 12. These teeth 24, 25 are therefore formed in a certain known and conventional pattern and/or shape. In accordance with the teachings of the preferred embodiment of the invention, base portion 30 further includes substantially identical slotted apertures 55, 57, 59, 63; slotted aperture 61, slotted "blind" type aperture 53, and a pair of substantially identical and generally circular apertures 42. The apertures 55, 57, 59, 63, and 42 are used to movably secure and/or position portions of assembly 12 to and/or upon the base member 30. Apertures 55, 57, 59, and 63 are further used to secure assembly 12 upon fuel pump assembly 14.

Figure 6:
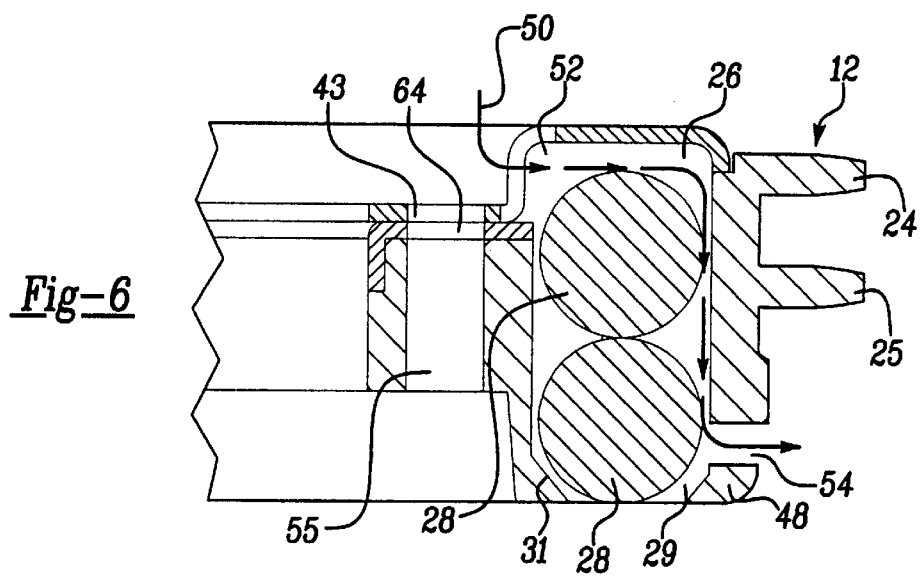
FIG. 6 is a fragmented sectional view of the vibration absorption assembly which is shown in FIGS. 1 and 2, which is taken along view line 6—6, and which illustrates the flow of oil through a portion of the assembly.
Figure 7:
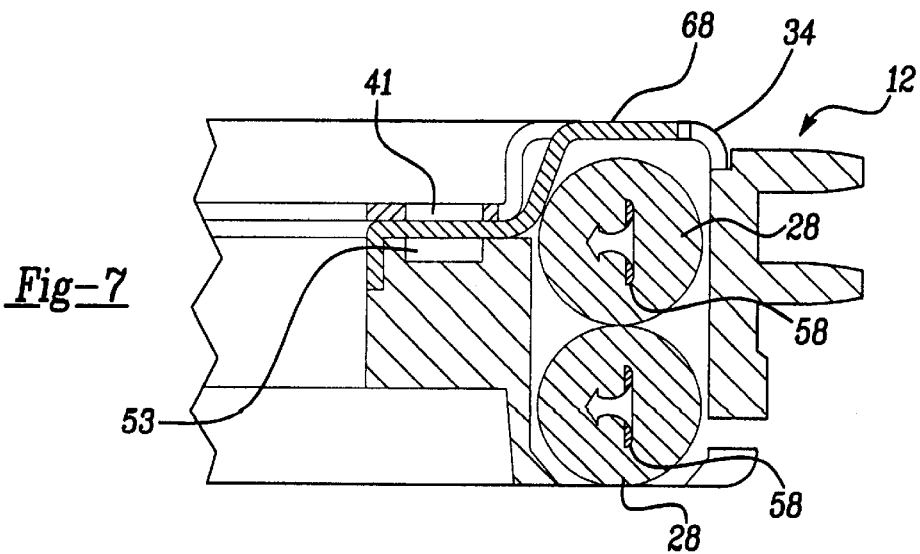
FIG. 7 is a fragmented sectional view of the vibration absorption assembly which is shown in FIGS. 1 and 2, which is taken along view line 7—7, and which illustrates the vibration dampening aspects of the assembly.

Certain substantially identical, circular, and tapered cavities and/or apertures 26 are also selectively formed and arranged, in an evenly spaced circumferential pattern, within base portion or member 30 and around the central aperture 7. Particularly, apertures 26 are adapted to each selectively and operatively contain a pair of substantially identical spherical balls or members 28 which cooperatively, independently, and movably absorb the vibrational energy which emanates from the fuel pump assembly 14. The generated vibrational energy is communicated to the assembly 12 due to the placement of the assembly 12 upon the fuel pump assembly 14. In one non-limiting embodiment of the invention, the diameters of the apertures or cavities 26 within portion 30 are about 15.46328 millimeters. In a further non-limiting embodiment of the invention, the diameter of each ball or spherical member 28 is about 15.08125 millimeters. The tapered bottom portion 29 of each aperture 26 substantially prevents the respectively and movably contained balls or spherical members 28 from exiting the bottom portion or surface 31 of member 30. A slotted aperture 54, shown best in FIGS. 6 and 7, is formed within the base portion 30. Particularly, the slotted aperture 54 is proximate to and communicates with each of the cavities 26 and aperture 54 is formed slightly above surface 31.

Further, as best shown in FIG. 4, assembly 12 includes an intermediate and selectively and independently rotatable and/or movable portion or member 32, and a front cover member 34 which substantially conforms to the shape of a saucer. That is, front member 34 includes a generally flat and substantially circular shaped upper portion 5 which is integrally formed with a generally flat and circular lower or depressed portion 35 by a wall portion 11. As shown, portion 35 includes substantially identical slotted apertures 43, 45, 49, and 51, relatively long slotted apertures 41 and 47, a pair of substantially identical and generally circular apertures or holes 38, and a central aperture 39. Central aperture 39 is substantially similar to aperture 7. Apertures 52 extend through the integrally formed wall 11 while apertures 46 extend through both the wall 11 and the upper portion 5.

The intermediate member 32 also includes a generally circular and flat member 60 having a pair of substantially identical and generally circular apertures or holes 40, slotted apertures 62, 64, and 66, and a central aperture 15 which is substantially identical to aperture 39. Intermediate member 32 also includes several raised tabs or flanges 68, 70, and 72 which are each substantially identical in size and shape to apertures 46.

During assembly, a first fastener, such as a shoulder type rivet 36, is operatively and insertably placed within a first of the apertures 38 of portion 34, within aperture 66 of portion 32, and within a first of the apertures 42 of portion 30. A second of the fasteners or rivets 36 is placed within and traverses a second of the apertures 38, within aperture 62, and within a second of the apertures 42. The fasteners or rivets 36 are cooperatively effective to allow member 32 to be rotatably and movably secured between members 30 and 34 and concomitantly allow member 34 to selectively move in the direction of arrow 71. Apertures 51 and 49 respectively communicate with apertures 57 and 63 through aperture 62. Aperture 43 communicates with aperture 55 through aperture 64 and aperture 45 communicates with aperture 59 through aperture 66. A fastener 37 is placed within and through each pair of communicating apertures 43, 55; 45, 59; 49, 63; and 51, 57, thereby securing the assembly 12 (e.g., sprocket 23) to the fuel pump assembly 14. Apertures 41, 40, and 53, as well as apertures 47, 40, and 61, also communicate. A screwdriver or another implement or member may be inserted within one or both of the communicative apertures 41, 40, and 53, or 47, 40, and 61, to selectively rotate or move intermediate member 32 within assembly 12. Communicating apertures 47, 66, and 61 allow passage of a conventional alignment tool, through the assembly 12, to hold the rotary position of the fuel pump assembly 14 in the proper timing relationship to the crankshaft assembly 16 during engine assembly. Fasteners 37 also allow the intermediate member 32 to be movably and rotatably secured between top member 34 and bottom member 30. It should be appreciated that a different number of fasteners 37 may be used in other non-limiting embodiments of the invention. Also, apertures 7, 15, and 39 cooperate to allow assembly 12 to mountably and operatively received a movably and vibrating shaft or member, such as a portion of a diesel engine fuel injection pump, and to dampen or reduce the amount of vibrational energy emanating from or released by the received shaft or member by movement of the balls or elements 28 within the apertures 26, in a manner which is more fully delineated below.

Servicing the fuel pump 12 is also quickly accomplished. That is, as best shown in FIGS. 2 and 3, member 32 is movable, such as by placement of a screwdriver or member within communicating apertures 47, 40, 61 or 41, 40, 53 to a first position, shown best in FIG. 2, in which flanges 68, 70, and 72 respectively cover apertures 74, 76, 78 (each of which form a portion of the apertures 26), thereby respectively cooperating with the tapered portions 29 of apertures 74, 76, and 78 to retain the balls or spherical members 28, within the apertures 74–78. The flanges 68, 70, and 72 are also similarly movable to a second position in which flanges 68, 70, 72 do not overlay (e.g., are remote from) these respective apertures 74, 76, 78, thereby allowing the respectively contained balls or spherical members 28 to be removed from these apertures 74, 76, and 78 and selectively allowing access to servicing screws or attachment members 80, 82, 84, which respectively reside behind apertures 74, 76, 78 and which are shown in phantom in FIG. 1. In this manner, fuel pump 14 may be relatively quickly and easily serviced and/or removed from the diesel engine 10.

When vibration absorption assembly 12 is rotated or moved about the central aperture 7, the available oil or lubricating fluid 27, resident within engine 10, follows path 50, as best shown in FIG. 6, and is drawn into or "sucked" into the cavities 26 through slotted apertures 52, by centrifugal force. The oil 27 then follows path 50, longitudinally traversing and/or moving through the cavity or aperture 26 in a direction which is substantially perpendicular to the direction that the oil 27 entered the cavity 26, and substantially lubricates, coats, and/or reduces friction and/or wear by and between each pair of balls 28 and between the balls or movable elements 28 and the interior surface 29 of the aperture or cavity 26. The centrifugal force created from the rotation of assembly 12 continues to force, expel, and/or otherwise remove the oil 27 from the cavity or aperture 26 through the slotted aperture 54 and in a direction which is substantially perpendicular to the direction that the oil traversed the cavity 26 within and substantially parallel to the direction that the oil entered the cavity or aperture 26. It should be appreciated that the oil 27 moving through aperture or cavity 26 substantially removes "wear debris", and/or particles generated by the movement of the balls 28 and substantially reduces the friction of the balls 28 allowing balls 28 to more easily move or rotate and substantially increasing the operating life of the assembly 12.

As best shown in FIG. 7, during operation, the produced torsional vibration and/or vibrational energy emanating from fuel pump 14 is communicated to assembly 12 and causes balls or spherical members 28 to absorb a certain amount of the torsional vibration and/or vibrational energy which, in turn, causes balls 28 to move and/or oscillate in a pendulum-like fashion as illustrated by arrows 58, thereby dampening and/or substantially eliminating the vibrational force and/or energy.

It should be further appreciated that the previously delineated lubricant flow allows for the use of two such balls or spherical members 28. These "dual members" allow for the absorption of a relatively large amount of vibration force, even when the size of the apertures is limited by existing spatial constraints imposed by preexisting and/or predetermined designs and/or configurations of fuel injection pump 14 (e.g., in situations when the cavities or apertures 26 may not be made larger in diameter due to the required size, shape, and placement of fastener apertures 42).

It should be understood that the invention is not limited to the exact embodiment or construction which has been illustrated and described but that various changes may be made without departing from the spirit and the scope of the invention.

What is claimed is:

1. A vibration absorption assembly for use in combination with a vibrating member, said vibration absorption assembly comprising:

a housing which is mounted upon said vibrating member, said housing including at least one cavity, a first aperture which communicates with said at least one cavity, and a second aperture which communicates with said at least one cavity and which cooperates with said first aperture to cause oil to enter said cavity, to traverse said cavity, and to exit said cavity through said second aperture; and a pair of members which are moveably deployed within said cavity and which cooperatively dampen said vibrating member, said pair of members being lubricated by said oil which traverses said cavity.

2. The vibration absorption assembly of claim 1 wherein said vibrating member comprises a conventional fuel injection pump.

3. The vibration absorption assembly of claim 2 wherein each of said pair of members comprises a sphere.

4. The vibration absorption assembly of claim 3 wherein said oil enters said cavity along a first direction and wherein said oil exits said cavity along a second direction which is substantially parallel to said first direction.

5. The vibration absorption assembly of claim 4 wherein said oil traverses said cavity in a third direction which is substantially perpendicular to said first and second directions.

6. A vibration absorption assembly comprising:

a base member having a first and a second row of protrusions and at least one tapered cavity;

a pair of substantially spherical members which movably reside within said at least one cavity; and a second member which is movably coupled to said base portion and which is movable from a first position in which said second member overlays said at least one cavity to a second position in which said second member is remotely positioned from said at least one cavity.

7. The vibration absorption assembly of claim 6 wherein said base member further includes a first aperture and a second aperture which each communicate with said at least one cavity and which cooperatively allow oil to be selectively received by said at least one cavity.

8. The vibration absorption assembly of claim 7 wherein said oil enters said at least one cavity along a first direction and wherein said first and second apertures cooperate to cause said oil to traverse said at least one cavity along a second direction which is substantially perpendicular to said first direction.

9. The vibration absorption assembly of claim 8 wherein said lubrication fluid longitudinally traverses said at least one cavity.

10. The vibration absorption assembly of claim 9 wherein said oil is forced to enter said at least one cavity by centrifugal force.

11. A method for reducing the amount of vibrations emanating from a selectively rotatable member, said method comprising the steps of:

forming at least one cavity within a portion of said selectively rotatable member, said cavity having opposed first and second end portions which access said cavity;

movably disposing a pair of elements within said at least one tapered cavity;

tapering said first of said end portions, effective to substantially prevent said pair of elements from exiting said at least one cavity through said first of said end portions; and selectively covering said second of said end portions, thereby allowing said elements to be selectively and movably captured within said at least one cavity, effective to reduce said vibrations of said member.

12. The method of claim 11 wherein each of said elements comprise substantially identical spheres.

13. The method of claim 12 wherein said member comprises a diesel fuel injection pump.

14. The method of claim 13 wherein said portion comprises a chain sprocket portion of said diesel fuel injection pump.

15. The method of claim 14 further comprising the steps of:

providing oil; and causing said oil to selectively enter said at least one cavity.

16. The method of claim 15 wherein said step of causing said oil to enter said cavity comprises the step of causing said oil to longitudinally traverse said at least one cavity.

17. The method of claim 16 further comprising the step of causing said oil to enter said at least one cavity along a direction which is perpendicular to the direction in which said oil traverses said at least one cavity.

18. The method of claim 14 wherein said fuel pump has at least one fastener which fastens said fuel pump to an engine, said method further comprising the step of placing said fastener within said first end portion of said at least one cavity.

19. The method of claim 14 wherein said step of selectively covering said second of said end portions comprises the step of providing a member; and movably coupling said member to said portion of said vibrating member.

20. The method of claim 11 further comprising the step of creating a slotted aperture within said member, effective to allow said member to be moved by use of a tool.

\* \* \* \* \*